United States Patent [19]

Kent

[11] 3,914,812
[45] Oct. 28, 1975

[54] BEE-HIVE
[76] Inventor: Keith J. E. Kent, 254 Queensway, Toronto 18, Ontario, Canada
[22] Filed: May 6, 1974
[21] Appl. No.: 467,112

[52] U.S. Cl. .................................. 6/1; 6/4 A; 6/1 X
[51] Int. Cl. ......................................... A01k 47/00
[58] Field of Search............ 6/1, 2 R, 2 A, 4 R, 4 A, 6/10, 11

[56] References Cited
UNITED STATES PATENTS

| | | | |
|---|---|---|---|
| 1,982,419 | 11/1934 | Chrysler | 6/4 A |
| 2,188,719 | 1/1940 | King | 6/4 R |
| 2,593,296 | 4/1952 | Green | 6/1 X |
| 2,709,820 | 6/1955 | Wahl | 6/1 |
| 2,811,727 | 11/1957 | Faske | 6/1 X |

Primary Examiner—Hugh R. Chamblee
Assistant Examiner—J. Q. Lever

[57] ABSTRACT

A bee hive has a hollow vertical structure having a top horizontal opening, a closed bottom section, an upper honey collection region, a lower brood region and a side opening in the lower region through which bees can enter or leave. An excluder is disposed between upper and lower regions to allow bees to pass upward therethrough but to block passage of the queen. A horizontal grill having spaced parallel horizontal rods is secured to the top opening. A roof removably covers the grill. A plurality of spaced vertical frames in which honey is collected are disposed between the rods and are vertically slidable therebetween. A roof removably covers the grill and is secured to the top of the frames.

This hive is so designed as to lend itself easily, simply and inexpensively to mechanization.

4 Claims, 5 Drawing Figures

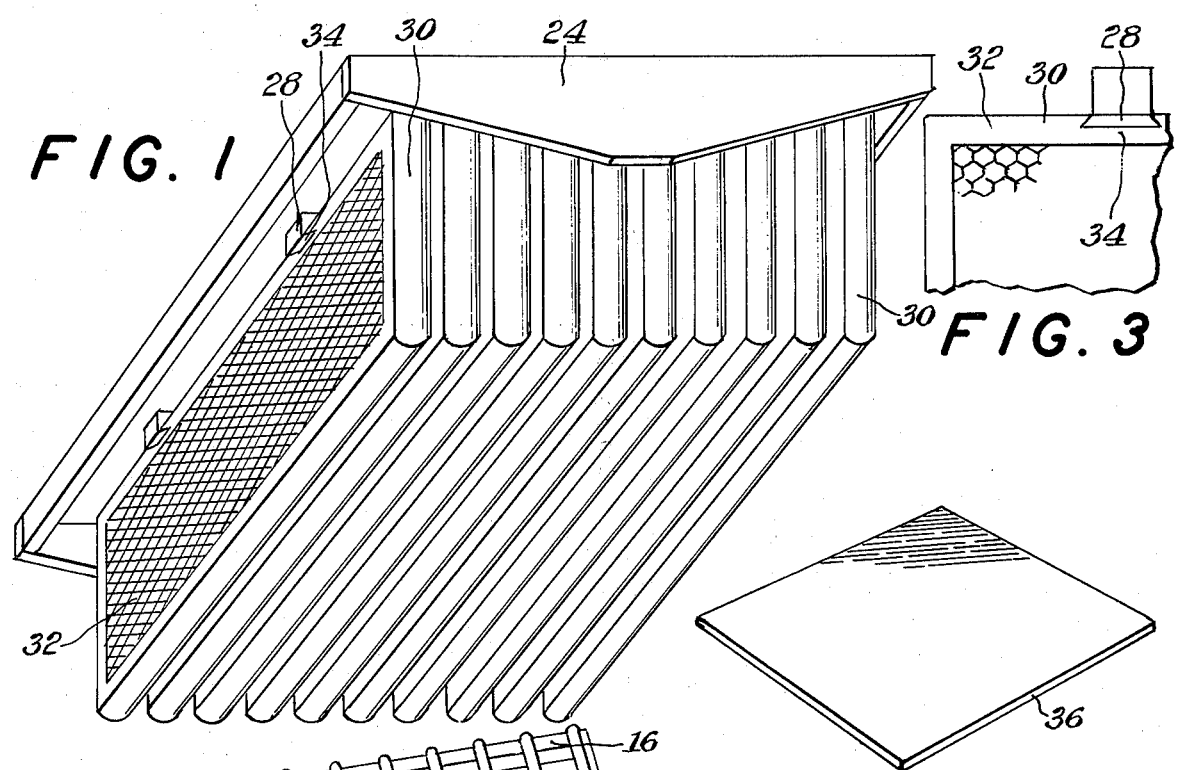
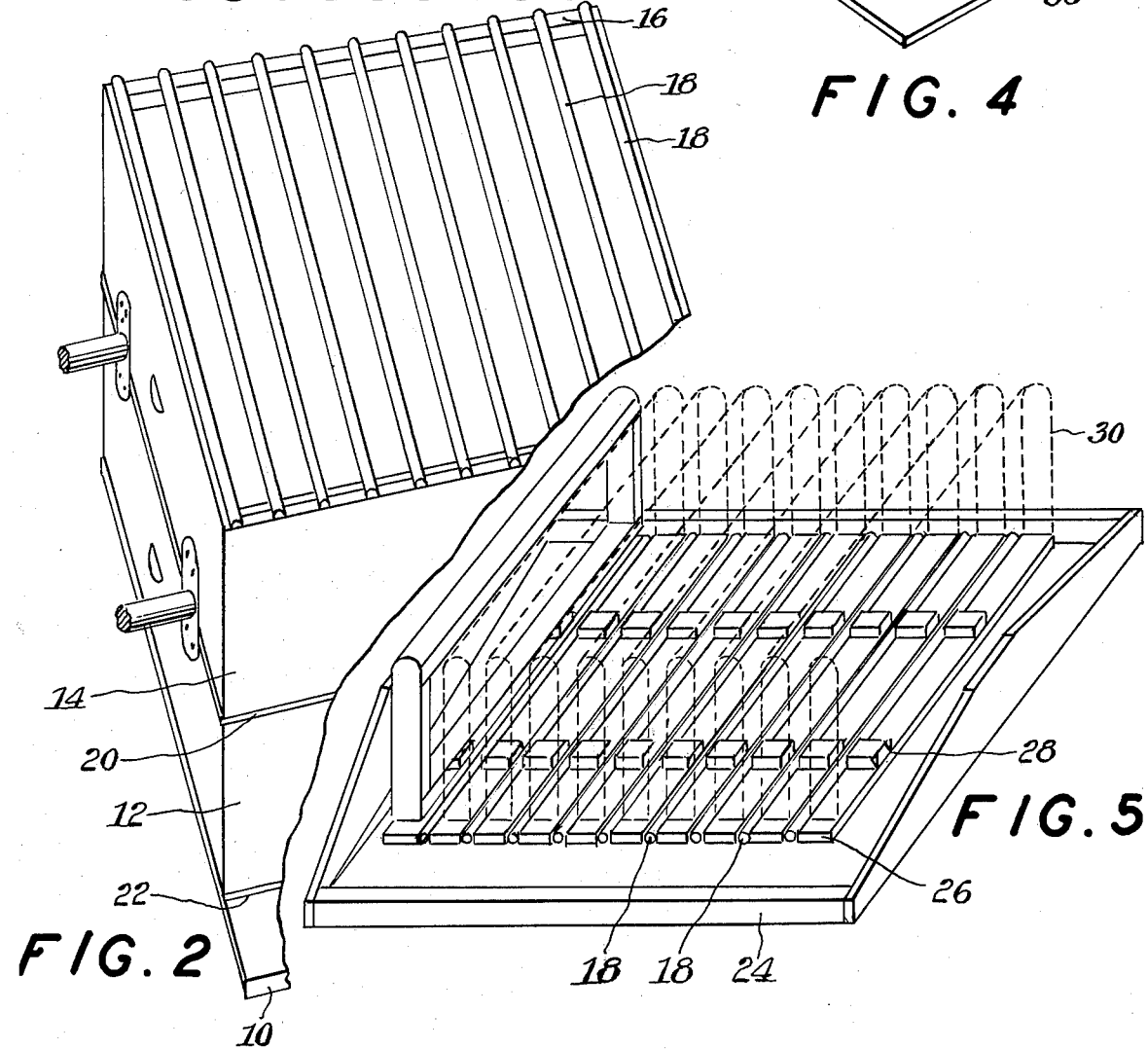

BEE-HIVE

SUMMARY OF THE INVENTION

This invention is directed toward a new type of bee hive in which the honey can be removed easily and quickly without allowing the bees to escape at the same time.

In accordance with the principles of this invention, a hive is provided with a removable roof having parallel spaced vertical frames extending downward therefrom. The frames are vertically slidable along spaced parallel horizontal rods of a horizontal grill disposed in an opening in the top of the hive.

Thus the frames wherein the honey is deposited by the bees can be readily removed by raising the roof whereby the honey can be easily removed from the frames. The rods of the grill act to brush the bees off the frames as the frames are slid vertically upward whereby the bees are kept in the hive. A temporary roof in the form of a flat cover can be applied detachably over the top opening in the hive to prevent bees from escaping during the interval when the frames are removed.

The hive is designed to readily, easily and inexpensively lend itself to mechanization.

BRIEF DESCRIPTION OF THE DRAWINGS

In the drawings:

FIG. 1 is a bottom perspective view of the roof with attached frames;

FIG. 2 is a top perspective view of the hive with roof and frames removed;

FIG. 3 is a detail view of a frame showing the cells for collecting honey;

FIG. 4 is a view of the temporary roof; and

FIG. 5 is a detail view showing the relationship between roof, grill and frame.

DETAILED DESCRIPTION OF PREFERRED EMBODIMENTS

Referring now to FIGS. 1–5, a vertical hollow rectangular structure has a bottom horizontal plate 10, a lower vertical section 12 defining a brood box in which the bees live, an upper vertical section 14 in which the honey is collected, and a horizontal top opening in section 14 containing a horizontal grill 16 having parallel horizontals rods 18.

A horizontal excluder 20 is disposed between the two regions and takes the form of a horizontal mesh having openings large enough for the bees to pass upward therethrough for the purposes of honey collection but too small to allow the queen to pass through, thus confining the activities of the bees other than honey formation in the broad region.

A side opening 22 in region 12 enables the bees to enter and leave the hive.

A removable roof 24 having extended sides removably covers the grill. The roof has parallel horizontal slats 26 on its inner surface. Each slat has two or more spaced vertical wedge shaped projections 28.

A plurality of vertical rectangular hollow open frames 30 containing the hexagonal cells 32 of a honey comb in which honey is collected each have a horizontally elongated top edge with wedge shaped openings 34, each opening being adapted to slidably receive a corresponding wedge projection 28 detachable mating engagement. As long as the wedges and openings are engaged, the frames are secured to the roof.

In use the frames extend downward past the rods of the grill, these rods being disposed between the frames, into the region 14. The honey is formed in the frames. The roof is then removed with the frames attached and the rods brush off the bees.

Temporary roof 36 in the form of a flat cover can be placed on top of the grill when the frames are removed to prevent bees from escaping.

While I have described my invention with particular reference to the drawings, such is not to be considered as limiting its actual scope.

Having thus described this invention, what is asserted as new is:

1. A bee hive comprising:
   a hollow vertical structure having a top horizontal opening, a closed bottom section, an upper honey collection region, a lower brood region and a side disposed opening through which bees can enter or leave disposed in the lower region;
   an excluder disposed between the upper and lower regions to allow bees to pass upward therethrough but to block passage of the queen;
   a horizontal grill having spaced parallel horizontal rods secured to said top opening;
   a roof removably covering said grill;
   a plurality of spaced vertical frames in which said honey is collected, said frames being disposed between the rods and vertically slidable therebetween; and
   means securing the tops of the frames to the bottom of the roof whereby said frames can be pulled out of the hive for easy removal of honey by raising the roof and the grill prevents bees from escaping.

2. The hive of claim 1 wherein said excluder is a mesh screen having openings large enough to pass bees and too small to allow the queen to pass through.

3. The hive of claim 2 further including a panel disposable over the grill as a temporary roof after the original roof has been raised.

4. The hive of claim 3 wherein said frames are detachably secured to the roof.

* * * * *